(No Model.)
J. D. SLOANE.
MICROMETER CALIPERS.
No. 455,644. Patented July 7, 1891.
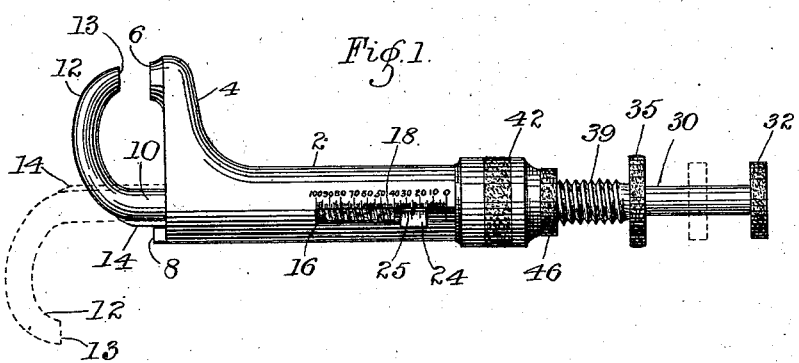
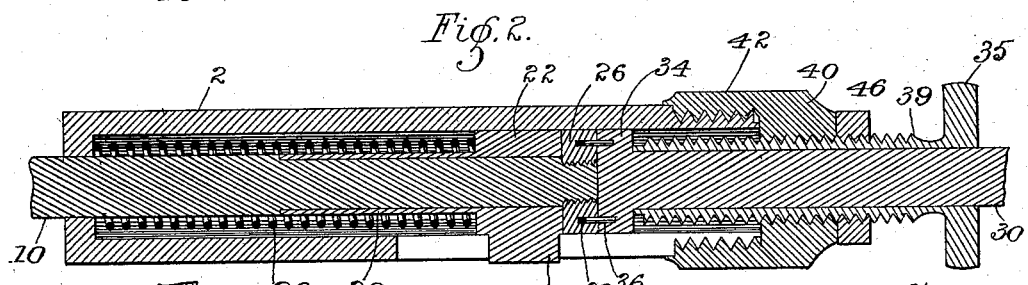
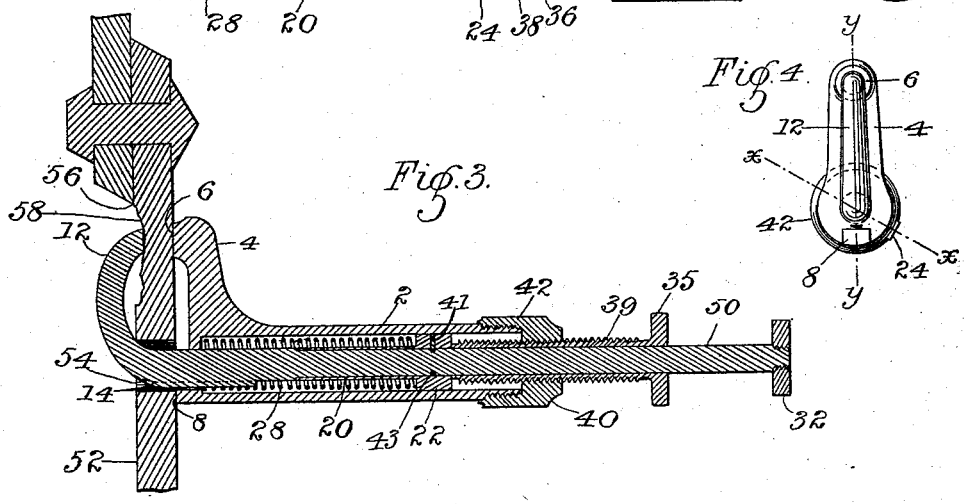
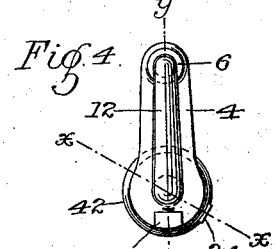
Witnesses:—
C. L. Caldwell.
A. Mar Welsh.
Inventor:—
John D. Sloane,
per Paul V. Merwin
Attorneys.

UNITED STATES PATENT OFFICE.

JOHN D. SLOANE, OF ST. PAUL, MINNESOTA, ASSIGNOR, BY MESNE ASSIGNMENTS, TO GERTRUDE DUVALL, OF SAME PLACE.

MICROMETER-CALIPERS.

SPECIFICATION forming part of Letters Patent No. 455,644, dated July 7, 1891.

Application filed January 3, 1891. Serial No. 376,591. (No model.)

*To all whom it may concern:*

Be it known that I, JOHN D. SLOANE, of St. Paul, Ramsey county, Minnesota, have invented certain improvements in Micrometer-Calipers, of which the following is a specification.

My invention relates to improvements in that type of micrometer-calipers designed especially for use in steam-boiler inspection to measure the thickness of the boiler-plates.

In order to determine the deterioration and erosion of the plates of boilers after long use, it is necessary and generally required by law to drill through the boiler-plate a hole of sufficient diameter to admit the calipers or other measuring instrument. For calipers of the ordinary type it is necessary to drill a large hole through the plate, usually at least an inch in diameter, which is afterward closed by a screw-plug, but which nevertheless seriously weakens and injures the boiler.

The object of my invention is to provide an instrument by means of which the examination of the boiler may be accurately accomplished without this injury to it.

In using my improved calipers it is unnecessary to drill a large hole through the plate, as it can be inserted through one from one-eighth to one-quarter of an inch in diameter, which, when properly plugged, causes no appreciable injury to the boiler.

My invention consists in providing a pair of calipers one leg of which is a small barrel or cylinder, the other leg consisting of a small rod sliding within the barrel, each provided with a caliper-point offset from their common axis. The inner leg, while held by means of a feather normally in position with the caliper-points in line with each other, may be pushed outward to free the feather from its groove and turned in the barrel, so as to swing its point away from the other or fixed point to permit of its being inserted through the opening in the plate, after which it is turned back into position for measuring.

My invention also consists in improved means for setting the calipers when the measurement is taken, or so recording the measurement that the instrument may be removed from the plate and the reading taken afterward.

My invention further consists in the construction and combination hereinafter described, and particularly pointed out in the claims.

In the accompanying drawings, forming part of this specification, Figure 1 is a plan view of my improved calipers, the full lines showing the instrument in position to take a measurement and the dotted lines showing the position of the inner leg and its point when turned into position to be inserted into or removed from an opening. Fig. 2 is an enlarged central longitudinal section of the instrument on line $x x$ of Fig. 4. Fig. 3 is a central longitudinal section on line $y y$ of Fig. 4, but showing a modified internal construction, with the calipers in position for measuring a boiler-plate; and Fig. 4 is an end view of the calipers.

In the drawings, 2 represents one caliper-leg, cylindrical in form and of convenient length, having the lateral extension 4 at one end, carrying the boss or bearing point 6, the end of the cylinder being also provided with a squared shoulder or abutment 8 on the opposite side, having its face exactly in alignment with the face of the boss or point 6 and at right angles with the axis of the barrel. Arranged in the cylinder is the rod 10, constituting the other caliper-leg, which slides freely in it, the outer or projecting end of the rod being bent over into the hook 12, with its point 13 directly opposite the point 6. In order to hold the leg 10 in position so that the caliper-points are directly in line with each other, the rod 10 is fitted with a feather 14, lying in a corresponding groove in the cylinder 2, in which it slides. Through the side wall of the cylinder is cut a slot 16, on the side of which is marked a graduated scale 18.

Arranged upon the reduced inner end of the rod 10 is a sleeve 20, having the enlarged end or head 22, which fits snugly within the barrel of the cylinder and is provided with a lug or projection 24, extending through the slot 16 and serving as an indicator to mark the reading of the scale. This indicator may be of any desired form; but I prefer to provide it with a vernier scale 25, which serves to aid in the reading of the graduated scale, the scales being so adjusted as to indicate the measurements of the calipers. The sleeve is held upon the rod preferably by means of a nut 26, threaded upon the inner end of the rod. Surrounding the rod, with one end bearing against the head 22 and the other against the end of the barrel, is a spiral spring 28, which tends to force the rod inward and to close the caliper-points. Arranged in the other end of the barrel is a plunger 30, having a milled head or nut 32, and provided on its inner end with a head 34, fitting closely within the barrel, and having points or teeth 36 projecting into corresponding sockets 38 in the nut 26. The rod 30 is fitted into a sleeve 39, which is threaded into the boss 40 of the cap-nut 42, screwed upon the outer end of the barrel. When the rod 30 is forced inward its head 34 abuts against the head 22 of the sleeve, the points 36 engaging the sockets 38. The rod 10 may thus be thrust outward until its feather is carried beyond its groove, when it can be rotated by turning the plunger so as to swing its point away from the other, as indicated by the dotted lines in Fig. 1. The sleeve 39, when screwed into the barrel by means of its milled head 35, bears upon the head 34 of the plunger 30 and holds it in contact with the nut 26, which prevents inward movement of the rod 10 and the caliper-points from approaching closer together.

A suitable set-nut 46, threaded upon the sleeve 39 and bearing against the boss 40, serves to lock the sleeve in any desired position, thus exactly fixing the relative positions of the scales and registering their reading. By this means a measurement taken in the dark or in a place where it cannot be readily noted is recorded so that it may be afterward read at the convenience of the operator when the calipers are removed. This is of special value in the examination of boilers where it is very difficult to read the scale accurately. By means of the plunger 30 and adjusting-sleeve 39 this setting of the scales can be accomplished with the greatest nicety. When the caliper-points are in bearing-contact with the object to be measured, the plunger is moved lightly to and from the rod 10, while the sleeve 39 is screwed down till, as easily determined by the touch, the plunger is held exactly in contact with the nut of the rod without pressing upon it strongly enough to overcome the tension of the spring. The sleeve being then locked by tightening the set-nut after the calipers are removed from the object, the spring will return the rod 10 to contact with the plunger and the scales to their original position, when the measurement can be read and noted.

In Fig. 3 is shown a modified construction of the calipers in which the caliper-rod and plunger are formed integral as the one rod 50, the instrument being shown with the points measuring a boiler-plate. The instrument so constructed is operated in the same manner as the other and the measurement registered by the adjustment of the sleeve 39 to bear against the collar or head 22, the sleeve 20 being held from sliding movement by means of a pin 41 passing through the collar and entering a circumferential groove 43 in the rod. The instrument is in this form less expensive, but not as delicate for use and nicety of adjustment as in the preferred construction shown.

In use in testing the boiler-plate 32 a small hole 54 is drilled through the plate near the joint or lap 56, since deterioration takes place chiefly next to the joint. This usually need be only from three-sixteenths to one-quarter of an inch in diameter, according to the thickness of the plate and the diameter of the rod 10 and its hook 12. The plunger 30 is then operated to thrust the rod 10 outward to free the feather and then to turn the hook 12 into the position shown by dotted lines in Fig. 1. The hook is then passed through the hole 54 and turned back to its normal position, when the spring closes the points upon the plate. The calipers then may be placed in any position desired around the hole in the plate to bring the inner point into the depressions 58 caused by corrosion, and the spring within the barrel of the instrument will automatically close the points and hold them in bearing-contact with the surfaces of the plate. The adjusting-sleeve 39 is then screwed down until no movement of the plunger-rod is perceptible, and locked by means of the set-nut, or, with the modified construction shown in Fig. 3, until it is brought into contact with the head of the sleeve carried by the caliper-rod. The rod 10 then is thrust outward and turned back to the dotted-line position and the calipers removed from the boiler. The points again being brought opposite are closed by the action of the spring until stopped by the adjusting-sleeve, when the measurement is read from the scale. The two bearing-surfaces of the abutment 8 and point 6 serve to steady the instrument and make accurate the measurement, the caliper-points being always held exactly in their proper position to determine the thickness of the plate. The hook shape of the inner caliper-leg serves to clear the burr which is formed upon the inner edge of the hole drilled through the plate, which in some cases interferes with accurate measurement with the ordinary form of calipers.

Different sized and proportioned inner caliper-legs may be used for different classes of work and to fit into various-sized openings and for the measurement of different thicknesses of plate.

It is apparent that while the instrument is especially adapted to the measuring of boiler-plates it is also useful for the measurement of other objects, especially where automatic action is desirable, and when it is desired that the reading of the scale should be registered for future reference or to enable one to take a measurement in the dark and note the reading afterward.

I claim—

1. A device of the class described, having legs slidable and rotatable upon each other and each provided with a caliper-point offset from their common axis, substantially as and for the purposes set forth.

2. In a device of the class described, the combination, with legs slidable and rotatable upon each other, provided with caliper-points, of means for automatically closing the points when in alignment, and means for holding them separated when out of alignment, substantially as and for the purposes set forth.

3. In a device of the class described, the combination, with the fixed leg and the slidable and rotatable leg, of caliper-points carried by said legs, means for automatically closing the points, and adjustable means for limiting their approach, substantially as and for the purposes set forth.

4. In a device of the class described, the combination, with the hollow cylindrical leg and the leg slidable and rotatable therein, of caliper-points offset from their common axis, means for holding the points in alignment, means for automatically closing said points, and means for limiting their closing movement, substantially as and for the purposes set forth.

5. In a device of the class described, the combination, with the hollow cylindrical leg and the leg slidable and rotatable therein, of caliper-points offset from their common axis, means for holding the points in alignment, means for automatically closing said points, means for limiting their closing movement, and means for laterally separating them, substantially as and for the purposes set forth.

6. In a device of the class described, the combination, with the legs slidable and rotatable upon each other, of caliper-points carried by said legs, locking mechanism to prevent rotation of said legs when their points are in alignment, and adjustable mechanism limiting the approach of the points, substantially as and for the purposes set forth.

7. In a device of the class described, the combination of legs slidable and rotatable upon each other and each provided with a caliper-point offset from their common axis, of a scale and indicator carried respectively by them, substantially as and for the purpose set forth.

8. In a device of the class described, the combination, with the legs slidable and rotatable upon each other, of a scale carried by one, an indicator carried by the other, and an adjustable stop for said indicator, substantially as and for the purposes set forth.

9. In a device of the class described, the combination, with the legs adjustable in a right line upon each other, of caliper-points carried by said legs, measuring devices upon said legs, and an adjustable stop fixing the minimum distance between said points, substantially as and for the purposes set forth.

10. In a device of the class described, the combination, with the legs adjustable in a right line upon each other and provided with caliper-points, of measuring devices carried by said legs, and an adjustable stop for fixing the minimum measurement of said devices, substantially as and for the purposes set forth.

11. In a device of the class described, the combination of a fixed leg and a movable leg slidable in a right line and rotatable upon the other, caliper-points carried by said legs, locking mechanism to prevent such rotation when the points are in alignment, a spring for sliding said legs upon each other to close said points, means for disengaging the locking mechanism and laterally separating the points, a scale carried by one leg, a vernier carried by the other, and an adjustable stop limiting the sliding movement of said legs in closing the points, substantially as and for the purposes set forth.

12. In a device of the class described, having one caliper-leg slidable in a right line within the other as a guide and rotatable therein, and points on said legs offset from their common axis, the combination of a projection upon one leg engaging a groove in the other to hold their points in alignment, and means for disengaging said projection from said groove and rotating said inner leg to laterally separate the points, substantially as and for the purposes set forth.

13. In a device of the class described, the combination, with the legs slidable and rotatable one within the other, of a scale upon the outer leg, and a loose sleeve upon the inner leg carrying an indicator for said scale, substantially as and for the purposes set forth.

14. In a device of the class described, the combination, with the legs slidable and rotatable one within the other, of a scale upon the outer leg, a loose sleeve carried by the inner leg, an indicator carried by said sleeve adjacent to said scale, and an adjustable stop for fixing the minimum measurement indicated on said scale, substantially as and for the purposes set forth.

15. In a device of the class described, the combination of one leg formed as a hollow cylinder, the other leg as a rod slidable and rotatable within the same, caliper-points carried by said legs offset from their common axis, and an abutment upon the end of the outer leg opposite and in alignment with the face of its caliper-point and at right angles with its axis, substantially as and for the purposes set forth.

16. In a device of the class described, the combination, with one leg formed as a hollow cylinder and the other as a rod slidable and rotatable within the same, of caliper-points carried by said legs offset from their common axis, a feather upon the inner leg engaging a groove in the outer leg and holding the points in alignment, a spring for automatically sliding said legs upon each other to close their points, measuring devices carried by said legs to indicate the distance between their points, a plunger sliding in said cylinder and abutting against the end of the outer leg, and an adjustable sleeve surrounding said plunger and engaging the same and limiting its outward movement, substantially as and for the purposes set forth.

17. In a device of the class described, the combination of the legs having a common axis and slidable one within the other and rotatable upon each other when their points are separated a predetermined distance, means for holding the points in alignment, a spring for automatically closing the points when in alignment, a plunger working in the outer leg and abutting against and engaging the inner leg, whereby the leg may be thrust outward and turned upon its axis to laterally separate the points, and an adjustable stop limiting the reverse or outward movement of said plunger, substantially as and for the purposes set forth.

In testimony whereof I have hereunto set my hand this 29th day of December, 1890.

JOHN D. SLOANE.

In presence of—
T. D. MERWIN,
A. MACWELCH.

Correction in Letters Patent No. 455,644.

It is hereby certified that in Letters Patent No. 455,644, granted July 7, 1891, upon the application of John D. Sloane, of St. Paul, Minnesota, for an improvement in "Micrometer-Calipers," the name of the assignee was erroneously written and printed "Gertrude Duvall," whereas said name should have been written and printed *Gertrude Duvall Sloane*; that the proper correction has been made in the files and records pertaining to the case in the Patent Office, and should be read in the Letters Patent to make the same conform thereto.

Signed, countersigned, and sealed this 14th day of July, A. D. 1891.

[SEAL.]

GEO. CHANDLER,
*Assistant Secretary of the Interior.*

Countersigned:
NATH'L L. FROTHINGHAM,
*Acting Commissioner of Patents.*